A. C. BLACK.
Water-Closet Valves.
No. 129,920. Patented July 30, 1872.
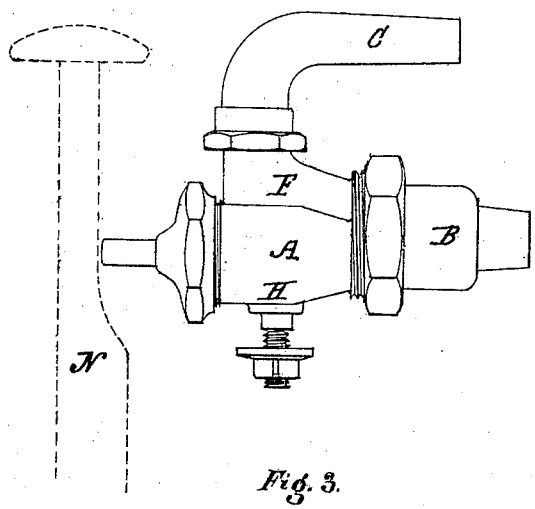
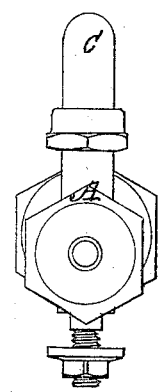
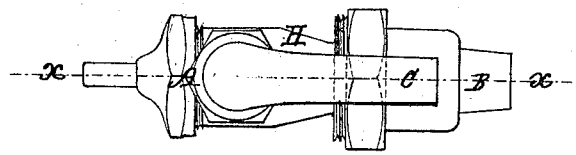
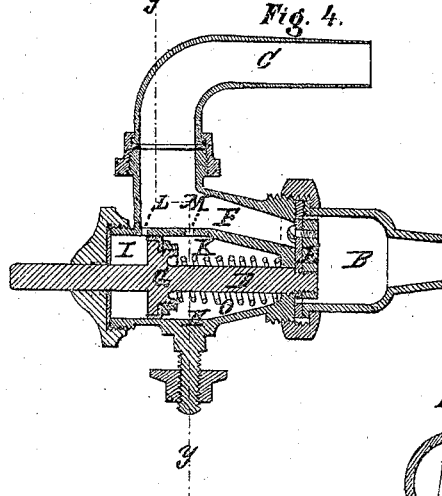
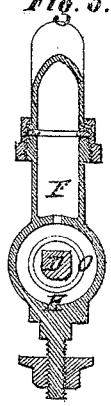
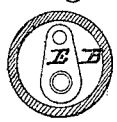
Witnesses:
Arthur Neill
William Parker
Inventor:
Andrew C. Black

UNITED STATES PATENT OFFICE.

ANDREW C. BLACK, OF BROOKLYN, E. D., NEW YORK.

IMPROVEMENT IN WATER-CLOSET VALVES.

Specification forming part of Letters Patent No. 129,920, dated July 30, 1872.

Specification describing certain Improvements in Water-Closet Valves, invented by ANDREW C. BLACK, of Brooklyn, E. D., Kings county and State of New York.

The object of my invention is to produce in a water-closet valve a means of giving a direct, quick, and copious supply of water on raising the pull, and a slow and easy closing of the valve on dropping the pull, for the purpose of giving the basin sufficient water after use to secure a good wash; the nature of which consists of a valve-casing independent of the supply and discharge pipes, and in which the valve is actuated by dividing its case into two chambers, both of which are filled with water through unequal orifices and alternately discharged as the pull is raised and dropped, causing a ready opening of the valve as the pull is raised, and the water by it is discharged through the larger orifice, and a slow automatic closing of the valve when the pull is dropped and the water discharged by said valve through the smaller orifice, as I will further explain by reference to the accompanying drawing, in which—

Figure 1 is an elevation of my invention; Fig. 2, an end view; Fig. 3, a top view; Fig. 4, a vertical section on line $x\,x$, Fig. 3; Fig. 5, transverse section on line $y\,y$, Fig. 4; and Fig. 6, a section showing foot of valve.

In the said drawing, A is the water-closet valve device, of which B C are the supply and discharge pipes. D is the valve, its foot E closing the water-way F. G is a plunger on the stem D, dividing the valve-casing H into two chambers, I K, the chamber I having a small orifice, L, and the chamber K a large orifice, M, for entry and discharge of the water. Now, as the pull N is raised, the valve is pushed forward, raising its foot E from the water-way F, the water in the chamber K being forced out the larger orifice M by the plunger G, preventing jar of the valve, and, as the pull is dropped, the return of the plunger, aided by the pressure-spring O, forces the water out the small orifice L, permitting the valve to close slowly, giving the basin, after use, water for sufficient wash.

What I claim as my invention, and desire to secure by Letters Patent, is—

The chamber H, with its plunger G and small and large orifices L M, opening, respectively, into its two chambers, I K, in combination with the valve D E and water way or passage F, substantially as and for the purpose herein specified.

In testimony whereof I have hereunto set my signature February 13, 1872.

ANDREW C. BLACK.

Witnesses:
 ARTHUR NEILL,
 WILLIAM BARKER.